(12) United States Patent  (10) Patent No.: US 8,908,518 B1
Arnold  (45) Date of Patent: Dec. 9, 2014

(54) SERVICE CLASS ID FOR MULTIMEDIA STREAMS OVER IP NETWORKS

(75) Inventor: Erich C. Arnold, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 249 days.

(21) Appl. No.: 13/112,001

(22) Filed: May 20, 2011

Related U.S. Application Data

(60) Provisional application No. 61/346,510, filed on May 20, 2010.

(51) Int. Cl.
 *H04L 12/16* (2006.01)
 *H04L 12/833* (2013.01)

(52) U.S. Cl.
 CPC ........ *H04L 47/2458* (2013.01); *H01L 47/2408* (2013.01)
 USPC .......................................................... 370/235

(58) Field of Classification Search
 None
 See application file for complete search history.

(56) References Cited

U.S. PATENT DOCUMENTS

| | | | |
|---|---|---|---|
| 2001/0047423 A1* | 11/2001 | Shao et al. | 709/235 |
| 2002/0080720 A1* | 6/2002 | Pegrum et al. | 370/236 |
| 2002/0122432 A1* | 9/2002 | Chaskar | 370/466 |
| 2002/0141341 A1* | 10/2002 | Haggar et al. | 370/232 |
| 2003/0095551 A1* | 5/2003 | Gotoh et al. | 370/395.3 |
| 2004/0203657 A1* | 10/2004 | Koskelainen | 455/414.1 |
| 2006/0168133 A1* | 7/2006 | Park et al. | 709/219 |
| 2008/0089324 A1* | 4/2008 | Polk et al. | 370/389 |

OTHER PUBLICATIONS

IPTV over Wimax: Overview on the video path from the server to the Wimax end-user Rabin Badih Moawad May 2008 IEEE.*

* cited by examiner

*Primary Examiner* — Gregory Sefcheck
*Assistant Examiner* — Rina Pancholi
(74) *Attorney, Agent, or Firm* — Troy A. Van Aacken

(57) ABSTRACT

Systems and methods can operable to provide a service class identifier field for packets transmitted over a network. Systems can include an interface, a control device and a transmitter. The interface can receive a data packet comprising a packet header and payload, and the packet header can include a differentiated services code point field. The control device can identify one or more network traffic parameters of a data stream associated with the received data packet and modify the data packet to include one or more service class identifier codes associated with the data packet. The transmitter can forward the modified data packet to a network device suited to interpret the service class identifier codes through one or more intermediate routers.

17 Claims, 8 Drawing Sheets

| | 0 | 1 | 2 | 3 | 4 | 5 | 6 | 7 |
|---|---|---|---|---|---|---|---|---|
| | | Differentiated Services Code Point (DSCP) | | | | | Explicit Congestion Notification (ECN) | |

| Prec/Drop P | 000 | 001 | 010 | 011 | 100 | 101 | 110 | 111 |
|---|---|---|---|---|---|---|---|---|
| 000 | BE | | | | | | | |
| 001 | | | AF11 | | AF12 | | AF13 | |
| 010 | | | AF21 | | AF22 | | AF23 | |
| 011 | | | AF31 | | AF32 | | AF33 | |
| 100 | | | AF41 | | AF42 | | AF43 | |
| 101 | | | | | | | | |
| 110 | | | | | | | EF | |
| 111 | | | | | | | | |

SERVICE CLASS ID FOR MULTIMEDIA STREAMS OVER IP NETWORKS

RELATED APPLICATIONS

This application is a non-provisional application claiming the benefit of U.S. Provisional Application Ser. No. 61/346,510, entitled "Service Class ID For Multimedia Streams over IP Networks," filed May 20, 2010, which is hereby incorporated by reference in its entirety.

TECHNICAL FIELD

This disclosure relates to implementing Quality of Service (QoS) on multimedia data streams transmitted over IP networks.

BACKGROUND

Data packets transmitted over the Internet are encoded using a variety of signaling and transmission formats. For example, one well-known format for carrying data packets is known as the Internet Protocol (IP). IP data is typically transported over the Internet using a transmission protocol known as the Transmission Control Protocol (TCP). The resulting combination is often referred to as TCP/IP.

As is the case with many popular technologies, TCP/IP has been standardized based on a general consensus amongst a number of industry personnel, thereby making the format suitable for providing interoperability between the various hardware and software entities that make up the Internet.

Among hardware elements, routers play a significant role in receiving TCP/IP data packets and directing individual data packets to their appropriate destinations based on information carried in the header portion of each data packet. The information in the header portion can be used by routers not only for routing data packets but can also used for enforcement of a desired Quality of Service (QoS), for example.

In this context, there is a certain type of header byte that is used for executing various types of QoS services. This header byte has been defined and refined under different versions of the Internet Engineering Task Force (IETF) standards. Specifically, when used in IPv4 (IP version 4) applications, this header byte is often referred to as a Type of Service (TOS) packet header. When used in IPv6 (IP version 6) applications, the header byte may be referred to as a Traffic Class (TC) packet header. However, regardless of the labeling, the individual bits contained in the header byte are used in the same way in both IPv4 and IPv6. Six of the high order bits (bits 0-5) are referred to as belonging to the differentiated services code point (DSCP) field, while the remaining two low order bits (bits 6 and 7) are either left unused or sometimes used for explicit congestion notification (ECN) purposes.

The DSCP field can be used for conveying QoS related information to one or more routers for purposes of carrying out tasks such as managing traffic congestion queues. As a part of this activity, a router can, for example, utilize the DSCP field to identify and provide precedence to certain types of data packets while dropping certain other types of data packets.

Naturally, in order to effectively interoperate with each other, a first router manufactured by a first manufacturer should recognize and interpret the DSCP field in the same manner as a second router manufactured by a different manufacturer. Therefore, it is in the best interests of the various manufacturers and network operators to comply with standards such as IPv4 and IPv6, even if some of these standards may be less than ideal for their individual needs.

On the other hand, where compliance to these standards is optional, such as in privately owned networks or in dedicated networks, it may be more desirable to use customized solutions for implementing QoS rather than abide by the one-size-fits-all approach.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

FIG. 5 is a diagram illustrating a header byte used for implementing QoS in the communication system shown in FIG. 1.

FIG. 6 is a table having various entries that are pertinent to a DSCP field of a prior-art header byte.

DETAILED DESCRIPTION

The various embodiments of this disclosure generally describe systems and methods related to implementing QoS for handling variable bandwidth data carried over a communications network.

Figure 1:
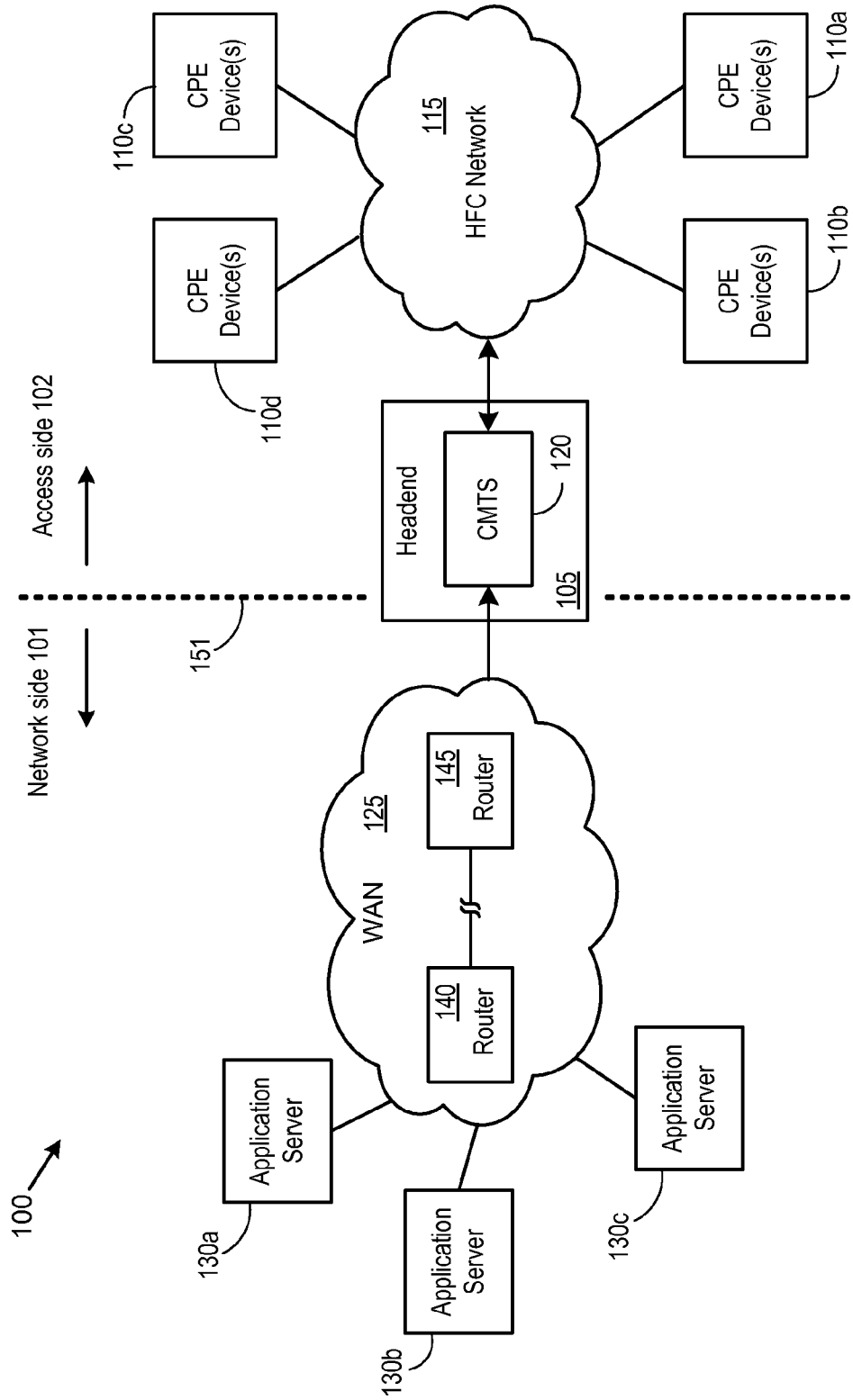
FIG. 1 is a block diagram illustrating an example communication system that includes various network elements such as a router, an application server, a CMTS device and a CPE device.

FIG. 1 shows a communication network 100, which includes a wide area network (WAN) 125 and a Hybrid Fiber Coax (HFC) network 115. Communication network 100 may be generally partitioned into two sides that are demarcated by dashed line 151. The WAN side may be referred to as a network side 101, while the HFC side may be referred to as an access side 102. It should be understood that this demarcation and labeling has been carried out herein solely for the purposes of simplifying the description below, and should not be misconstrued as a limiting boundary that prohibits any overlap in features, standards, or applications between the two sides.

In a general sense, various industry wide standards, such as those formulated by the Internet Engineering Task Force (IETF), are applied to several processes and elements (hardware, software, data packet processing etc.) that are incorporated into the network side 101 of communication network 100—typically for reasons such as inter-operability and industry-wide compliance.

However, on the access side 102, a certain degree of flexibility and control is available to vendors for selecting between the use of industry standards that may not be entirely suitable to their needs and customized solutions that are better suited to their individual needs. It should also be understood that these vendors can have independent control, ownership or other arrangements on certain elements on the network side 101 as well, thereby permitting the application of customized solutions on these network side elements as well. For example, a vendor can have the ability to independently control and configure one or more application servers on the network side 101 and also the ability to independently control and configure the head-end device 105 and CPE devices 110*a-d* on the access side 102.

In the example configuration shown in FIG. 1, various elements such as one or more application servers 130*a-c*, head-end device 105, HFC network 115, and customer premises equipment (CPE) devices 110*a-d*, can be independently owned and operated by a service provider (such as, for example, a cable company or multiple service operator (MSO)) for providing multimedia services to multiple customers. As a result of this configuration, IP data packets that are propagating through certain network side 101 elements (such as, for example, routers 140 and 145) can be subjected to processing based on industry standards and then upon entering the access side 102 can be subjected to processing based on one or more customized standards/solutions that are preferred by the service provider. Further details of certain customized standards/solutions, especially those customized for implementing QoS, are provided below.

Head-end device 105 is configured to operate as an interface between the network side 101 of communication network 100 and the access side 102 of communication network 100 in order to provide services, such as multimedia services, to various customers (not shown) associated with CPE devices 110*a-d*. For purposes of description herein, digital data propagating from head-end device 105 towards CPE devices 110*a-d* (via HFC network 115) can be considered downstream data, while digital data propagating in the opposite direction from CPE devices 110*a-d* towards head-end device 105 can be considered upstream data. When the digital data is composed of IP data packets carrying multimedia content, such as video signals associated with TV channels and/or movies, it is generally expected that the volume of downstream data will be significantly greater than the volume of upstream data. In other words, the downstream bandwidth demand generally exceeds the upstream data bandwidth demand by a significant margin.

Furthermore, downstream bandwidth demand is typically not of a static nature and in fact may vary in a dynamic fashion based on numerous factors. A few examples of such factors include: the number of customers that are actively downloading content at any particular instant in time, the type of applications (e.g. video games, TV shows, web-surfing, video downloads etc) being executed by customers at any particular instant in time, and the nature of the delivered content (e.g., TV shows, movies, and/or personal computer (PC) related content such as e-mails, text, photographs, chat messages etc.), among many others. Fluctuation in downstream bandwidth demand will be explained below in more detail using an example that pertains to a service provider providing multimedia services from head-end device 105 to multiple customers associated with CPE devices 110*a-d*.

In this example, it can be assumed that a certain number of customers are interested in watching TV during a prime time hour. Of these customers, a first customer who owns or rents CPE device 110*d* for example, may watch a particular TV show in a standard definition (SD) format, a second customer may watch the same, or another, TV show in a high definition (HD) format, while a third customer may opt to watch one TV show in a HD format while simultaneously downloading a movie into a digital video recorder (DVR). In mid-show, the first customer may get bored watching the TV show in the SD format and switch channels to watch another TV show in a 3-dimensional high definition (3DHD) format. Signals in the SD format may be transported at a 3 Mbps data rate, in the HD format at an 8 Mbps data rate, and in the 3DHD format at a 12 Mbps data rate.

As a result of the action carried out by the first customer, the demand for downstream bandwidth would suddenly jump up in a manner that is unpredictable. When this happens, the service provider typically re-configures head-end device 105 so as to quickly increase the available downstream bandwidth capacity for accommodating the demand from CPE device 110*d*.

In one approach, attempts at predicting expected bandwidth demand can be made ahead of time and external control planes such as packet cable multimedia (PCMM) can be used for pre-allocating downstream bandwidth at the head-end device 105 and controlling signal transmission downstream using certain QoS features such as a service flow (SF). However, such control planes can be difficult to scale up when faced with highly dynamic media flow configuration changes. Typically, re-configurations can be carried out by transmitting messages between the individual CPE devices and corresponding head-end device using IP-messaging for example, with IP addresses assigned to each of the CPE devices and head-end devices. However, message-based systems can suffer from several handicaps. For example, there may be undesirable time delays involved with forming appropriate messages, finding suitable times and a suitable medium to transmit the messages, to receive acknowledgements, propagation delays, transmission errors etc. Such issues can lead to sub-optimal procedures in allocating unnecessary bandwidth and undesirable delays in carrying out dynamic bandwidth re-configuration (for example, changing a pre-allocated bandwidth at a head-end device and/or a network side device), especially when a customer is rapidly and randomly switching through different types of multimedia content.

Further back on the network side 101, head-end device 105 receives the digital data associated with the multimedia content from one or more servers that are communicatively coupled to head-end device 105 through WAN 125. Three such servers are shown as examples in FIG. 1-*application servers* 130*a-c*. When these application servers are specifically configured for transmitting digital data associated with video information such as TV signals and movies for example, the respective server may be more specifically called a video server. When configured for providing Internet services such as those associated with web browsing and email for example, the respective server may be called an IP data server.

One or more routers that are shown as part of WAN 125 are communicatively interconnected with each other in order to route data packets from one or more of application servers 130*a-c* to destination nodes such as head-end device 105. For example, router 140 may receive data packets from one or more of application servers 130*a-c* and propagate data packets that are intended for delivery to head-end device 105, to router 145, which then forwards these data packets to head-end device 105. In order to carry out QoS as part of the routing operation, each of routers 140 and 145 typically uses the differentiated services code point (DSCP) field of the TOS or TC packet header for carrying out operations such as managing congestion queues. Some aspects of these operations are described below in further detail.

Once the data packets are delivered by router 145 to head-end device 105, the data packets can be processed and propagated in the access side 102 via devices that may be owned and/or operated (probably on an end-to-end basis) by a single service provider (or co-operatively by several service providers), thereby permitting a certain degree of latitude in terms of using the DSCP field for additional or alternative purposes.

In some implementations, when the access side 102 is a data over cable system (DOCSIS), a QoS model incorporating features such as application priority, scheduling regime, latency requirements, and guaranteed bandwidth commitments can be applied to service flows (SFs) passing through a cable modem termination system (CMTS). Such implementations can provide benefits in comparison to systems that carry out bandwidth management using a message-based system for example. Aspects pertaining to such implementations as well as alternative implementations will be described below in further detail using other figures.

Elaborating further on FIG. 1, head-end device 105 can include various elements such as CMTS 120 and an edge quadrature amplitude modulation (EQAM) device (not shown). As pointed out above, head-end device 105 can be used for transmitting data in a downstream direction (towards CPE devices 110a-d) as well as for receiving data in an upstream direction (from CPE devices 110a-d). In some implementations, the CMTS 120 can use the EQAM device to modulate signals on to a carrier waveform in order to forward data packets. The data packets can include any of data, voice, video streams, and combinations thereof, in both multicast and unicast (e.g., point-to-point) formats for transmission to a combiner (not shown), which can combine multiple signals onto a single fiber for transmission to one or more CPE devices 110a-d via the hybrid fiber-coax (HFC) network 115. In other implementations, the CMTS 120 can modulate a baseband signal onto a carrier wave and transmit the signal to a combiner for upconversion to a transmission frequency.

Figure 2:
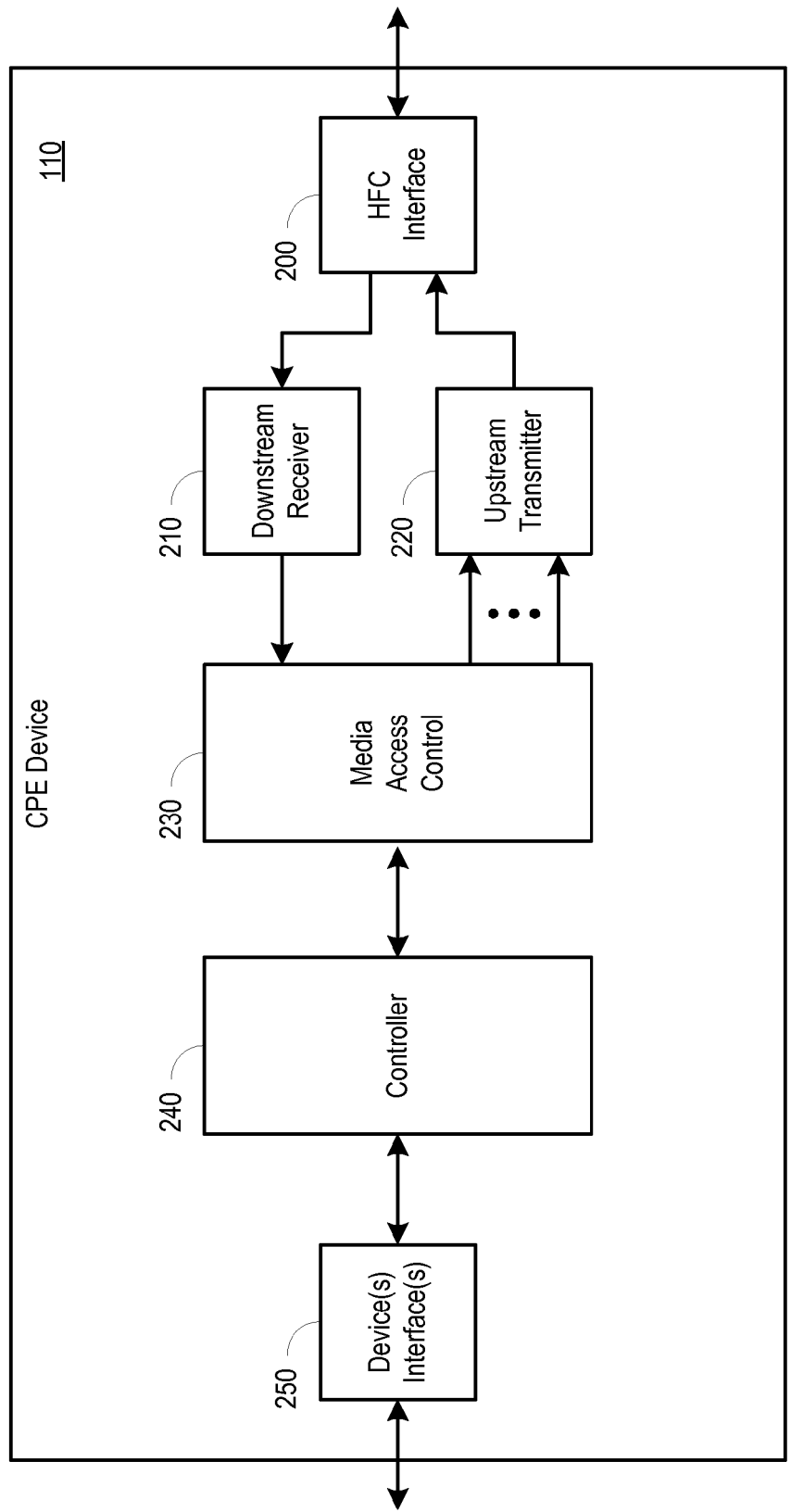
FIG. 2 is a block diagram illustrating additional details of a CPE device that is a part of the communication system shown in FIG. 1.

FIG. 2 is a block diagram illustrating a CPE device 110 that is representative of one or more of CPE devices 110a-d shown in FIG. 1. CPE device 110 includes an HFC network interface 200 for interfacing CPE device 110 to HFC network 115. Downstream signals transmitted from CMTS 120 in head-end device 105 to CPE device 110, through the HFC network 115, are received in CPE device 110 by the HFC interface 200. Conversely, upstream signals are transmitted from the HFC interface 200 of CPE device 110 to CMTS 120 in head-end device 105.

CPE device 110 further includes a downstream receiver 210 and an upstream transmitter 220. The downstream receiver 210 can include a tuner(s), demodulator(s), analog to digital converter(s) and analog signal conditioning circuitry. The downstream receiver 210 provides the media access controller (MAC) module 230 and controller 240 with packets from a downstream channel. Elements of the downstream receiver 210 can be integrated into MAC module 230. The downstream receiver 210 can be capable of providing packets from multiple downstream channels. The MAC module 230 can provide bandwidth allocation as controlled by CMTS 120 for downstream/upstream channel(s), initiation of upstream channel(s) requests, transmissions of packets on one or more bonded upstream channels, quality of service (QoS), and maintenance capabilities. The controller 240 can provide packet processing and control of the HFC interface 200, downstream receiver 210, MAC module 230, upstream transmitter 220 and the device interface(s) 250. The associated processing and control of CPE device 110 can be distributed between the MAC module 230 and the controller 240. The device interface(s) 250 can provide interconnect to external devices such as a video client device or a personal computer (PC), and can include industry standard Ethernet, wireless and universal serial bus (USB) interfaces, among many others. The device interface(s) 250 can be integrated into controller 240. The upstream transmitter 220 is capable of sending upstream packets from MAC module 230 on one or more upstream channels. The upstream transmitter 220 can include modulator(s), digital to analog converter(s) and analog circuitry. Some elements of the upstream receiver 220 can be integrated into MAC module 230.

Figure 3:
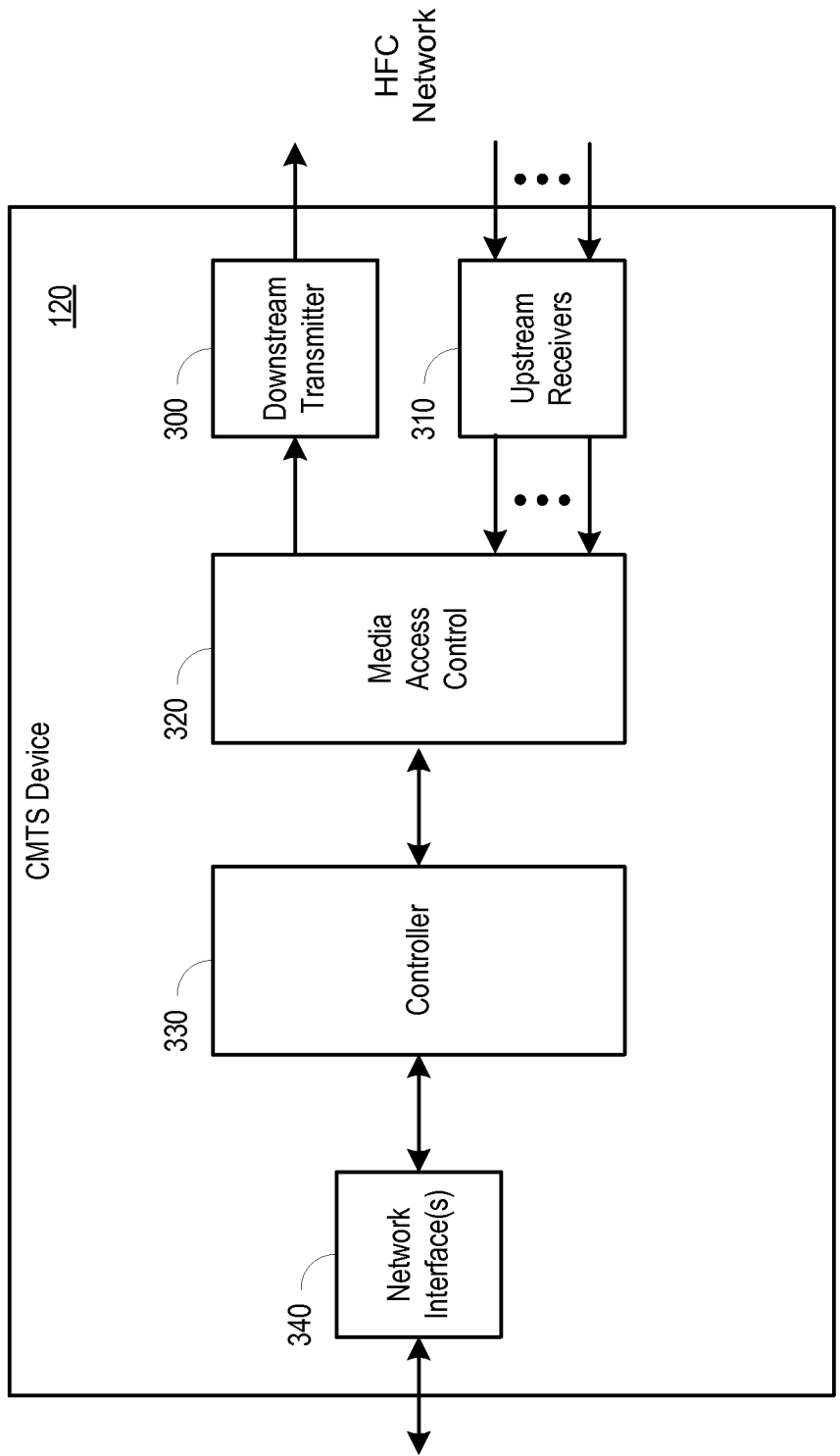
FIG. 3 is a block diagram illustrating additional details of a CMTS device that is a part of the communication system shown in FIG. 1.

FIG. 3 is a block diagram illustrating a CMTS 120 capable of providing a communication system and method from/to wide area network (e.g., WAN 125 of FIG. 1) to/from CPE devices (e.g., CPE devices 110a-d of FIG. 1) through an HFC network (e.g., HFC network 115 of FIG. 1). The CMTS 120 can include network interfaces 340 to communicate with the wide area network 125. The controller 330 can provide packet processing and control of the network interface(s) 340, MAC module 320, downstream transmitter 300 and upstream receivers 310. The MAC module 320 can provide bandwidth allocation for downstream/upstream channel(s), process packets from one or more upstream channel(s), QoS and maintenance capabilities. The associated processing and control of CMTS 120 can be distributed between the MAC module 320 and the controller 330. The downstream transmitter 300 receives packets from MAC module 320 for transmission into HCF network 115. The downstream transmitter 300 can include modulator(s), digital to analog converter(s), frequency translator(s), and analog signal conditioning circuitry. The downstream transmitter 300 can transmit on one or more downstream channels. The CMTS 120 can include multiple downstream transmitters 300 (not shown). Packets are received from HFC network 115 by the upstream receivers 310 and forwarded to MAC module 320 for processing. The upstream receivers 310 can receive packets from a CPE device on one or more upstream channels and can include demodulator(s), analog to digital converter(s) and analog signal conditioning circuitry.

Figure 4:
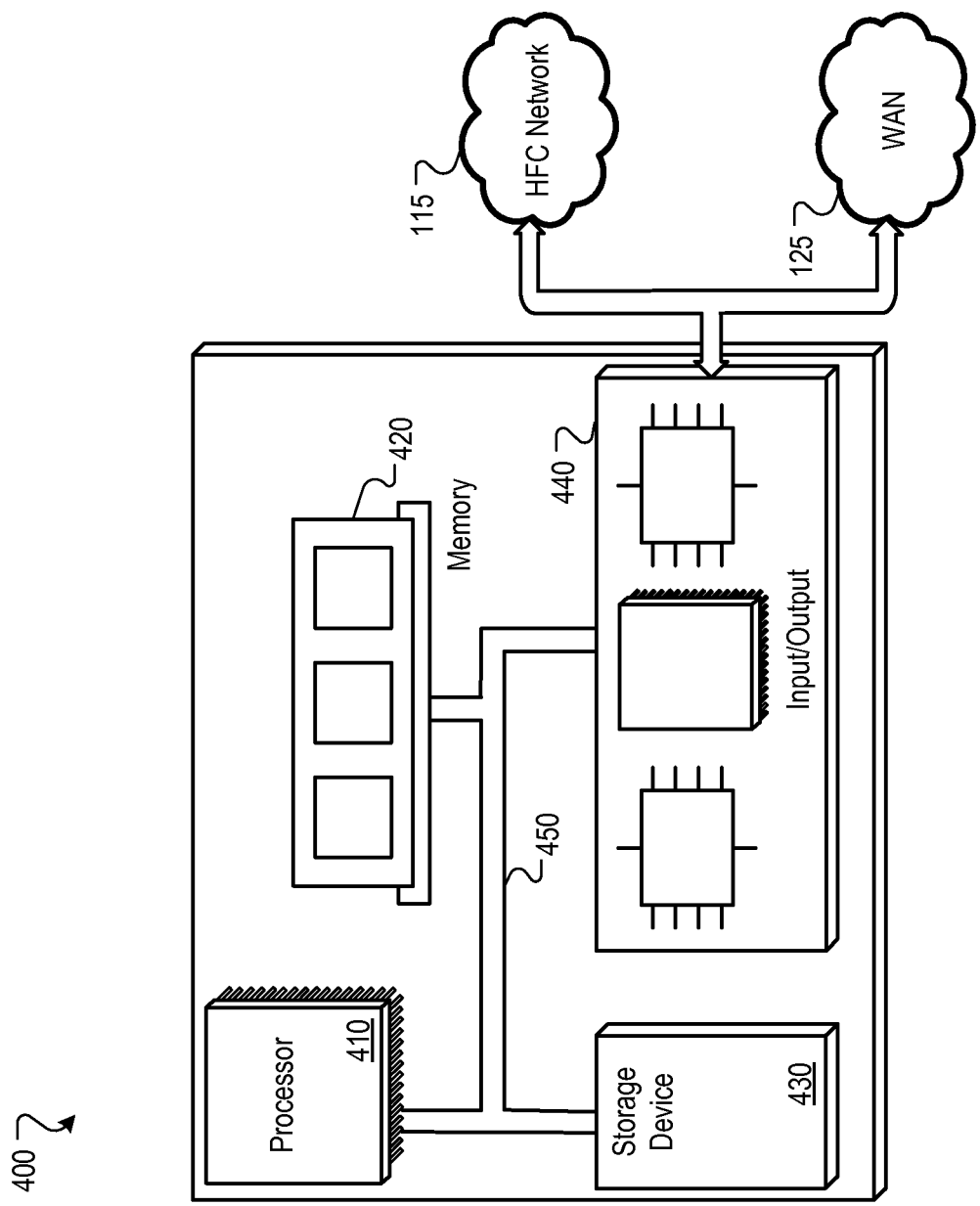
FIG. 4 is a block diagram illustrating an example controller that can be incorporated into one or both of the CPE device and/or the CMTS device.

FIG. 4 is a block diagram of a controller 400 that can be incorporated into one or both of CPE device 110 (controller 240) and CMTS 120 (controller 330) described above. Controller 400 can include a processor 410, a memory 420, a storage device 430, and an input/output device 440. Each of the components 410, 420, 430, and 440 can, for example, be interconnected using a system bus 450. The processor 410 is capable of processing instructions for execution. In one implementation, the processor 410 is a single-threaded processor. In another implementation, the processor 410 is a multi-threaded processor. The processor 410 is capable of processing instructions stored in the memory 420 or on the storage device 430.

The memory 420 stores information. In some implementations, memory 420 is a computer-readable storage medium. In various implementations, the memory 420 can be a volatile memory unit, a non-volatile memory unit, or combinations thereof.

In some implementations, the storage device 430 is capable of providing mass storage as one or more computer-readable storage media. In various implementations, the storage device 430 can, for example, include a hard disk device, an optical disk device, flash memory or some other large capacity storage device, and combinations thereof.

The input/output device 440 provides input/output operations. In some implementations, the input/output device 440 can include one or more of a wireless interface, HFC network interface, such as, for example, HFC interface 200 of CPE device 110, an Ethernet interface, a cellular network interface, a serial communication device, e.g., and RS-232 port, and/or a wireless interface device, e.g., and 802.11 card. In other implementations, the input/output device 440 can include driver devices configured to receive input data and send output data to other input/output devices, as well as sending communications to, and receiving communications from various networks (e.g., HFC network 115 and/or WAN 125). WAN 125 as well as HFC network 115 include various communications links such as wireless links, fiber-optic links, co-axial links, etc.

The features associated with communication network 100 described in this disclosure, and components thereof, can be realized by instructions that upon execution cause one or more processing devices in communication network 100 to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and flow charts described in this disclosure can be performed by one or more programmable processors executing one or more computer programs to perform functions by operating on input data and generating output thereby tying the process to a particular machine (e.g., a machine programmed to perform the processes described herein). The processes and logic flows can also be performed by, and an apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Typically, a processor can receive instructions and data from a read only memory or a random access memory or both. The elements of a computer typically include a processor for performing instructions and one or more memory devices for storing instructions and data. Typically, a computer will also include, or be operatively coupled to receive data from or transfer data to, or both, one or more mass storage devices for storing data, e.g., electronic, magnetic, magneto optical disks, or optical disks. However, a computer need not have such devices. Moreover, a computer can be embedded in another device, e.g., a cable modem termination system (CMTS), a converged edge quadrature amplitude modulation (QAM) device, a gateway device, a router, etc., to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

FIG. 5 shows a header byte 500 that can be generally used for implementing QoS in the network side 101 as well as the access side 102 of communication network 100 shown in FIG. 1. Various details associated with implementing industry-standard QoS is described in further detail below using FIG. 6, while various details associated with implementing a customized form of QoS is described in further detail below using FIG. 7.

As can be seen from the header byte 500, six bits (bits 0-5) are defined for DSCP use, while the remaining two low order bits (bits 6 and 7) can be either left unused or can be sometimes used for Explicit Congestion Notification (ECN) purposes.

FIG. 6 shows a table 600 having various entries that are pertinent to a DSCP field when header byte 500 of FIG. 5 is used as a prior art header byte in accordance with generally accepted industry practice. The AFxx, BE and EF entries in table 600 correspond to prior art codes. Of these codes, the 12 Assured Forwarding (AF) codes are exclusively assigned within even binary-numbered columns. To explain table 600 in further detail using code examples, the AF11 code can be assigned a 001010 code in the DSCP field; the AF21 code can be assigned a 010010 code in the DSCP field; the AF43 code can be assigned a 100110 code in the DSCP field and so on. The BE code pertains to a "best effort" code, while the "EF" code pertains to an "expedited forwarding" code. Each of the three bits in the column labeled "Prec/DropP" are the left-most bits of the DSCP field, while each of the three bits in the row labeled "Prec/DropP" are the right-most bits of the DSCP field.

Table 600 can be applied for implementing QoS on data packets that are traversing the network side 101. However, when these data packets reach the access side 102, the use of these codes becomes optional because the various elements such as CMTS 120 and CPE devices 110*a-c* may be owned and operated by a service provider who does not necessarily have to use these codes in the manner that is done in the network side 101.

In prior art practice, IP video media servers (such as Application servers 130*a-c*) handle network congestion by changing the transmission bandwidth based on signaling messages between the CPE media client and the media server. This process often results in TCP port number changes as well as media clients being switched from one video media server to another so as to mitigate the impact of network congestion on the viewer. As a further aspect of this process, one or more media client may start hunting for an alternative video media server in search of alternate media content when a stream from a given server is interrupted or slowed down. When this happens, network congestion control becomes unpredictable and complex.

Figure 7:
FIG. 7 is a table having various entries that are pertinent to a DSCP field that can be utilized for implementing QoS features between the CMTS device and the CPE device.

The issues described above with respect to network congestion can be mitigated by using the header byte 500 of FIG. 5 in an alternative manner. FIG. 7 shows a table 700 that includes not only the entries of prior-art table 600 but includes additional entries that complement the entries shown in table 600. These additional entries, designated as SCxx entries, correspond to service class identifier (SCID) codes that may be used in DOCSIS applications, as well as other applications that are configured to make use of these SCID codes.

To elaborate, the SCID codes, which can number up to 32 (as a result of the availability of all the odd-numbered columns in table 600 of FIG. 6), may be used to implement QoS services that are tailored for DOCSIS or for other applications that can interpret these SCID codes. Tailoring the SCID codes can facilitate vendors and access-side operators carrying out QoS functions that may not be applicable, or necessary, for carrying out data packet transport through the network side 101. For example, in DOCSIS it may be desirable to dynamically and rapidly change the transportation bandwidth for downstream multimedia delivery from CMTS 120 to CPE devices 110*a-c*. Such functionality may not be readily satisfied by existing QoS parameters such as those shown in table 600 of FIG. 6, thereby leading to the use of the SCID codes shown in table 700.

A few examples of how SCID codes are used will be described below using FIGS. 8 and 9. In terms of operation using the SCID codes, in one example implementation, an application server, such as one of the application servers 130*a-c* shown in FIG. 1, is configured to insert the appropriate SCID code (shown in the odd columns of FIG. 7) into the DSCP area of a data packet header before transmitting the data packet into WAN 125. The SCID code is indicative of a customized QoS parameter that can be used in the access side 102, such as for example, to indicate to CMTS 120 that the data packet is carrying a high-definition (HD) video signal. Routers 140 and 145 can opt to ignore these SCID codes because the routers are only interested in the even-column codes (AFxx, BE and EF) and execute QoS based on these even-column codes. However, once the data packet reaches head-end device 105, CMTS 120 which can be configured to recognize this SCID code as indicative of HD content provisions the appropriate downstream link to accommodate the bandwidth necessary for delivery of this HD content to the appropriate CPE device.

The SCID codes may be used for various operations, including, for example, bandwidth management, priority, latency, and scheduling regimes as appropriate for IP video services allocated to individual clients. Because the SCID codes can be uniformly applied across multiple elements in communication network 100, and each SCID code can be applied on a packet-by-packet basis at the originating points of these data packets (whether from one application server or from multiple application servers is immaterial from a system point of view), the CMTS 120 can look at each packet header and the SCID code within (which can be the same for several data packets, or different between data packets) without having to consider the originating source for individual data packets.

While the description above indicated that routers 140 and 145 ignore the SCID codes, in certain implementations, routers 140 and 145 may also be configured to use the SCID codes. Furthermore, in certain implementations, a subset of SCID codes may be defined to operate in a specific manner. For example, four SCID codes (SC11, SC13, SC15 and SC17), which correspond to the same row (001), can be configured as a first subset wherein each SCID code is interpreted in an identical manner (for example, in terms of the same forwarding treatment).

In yet other implementations, where routers 140 and 145 may be sensitive to upper range precedence values (which may lead to certain problems in using some of the higher order SCID codes such as SC41, SC43, SC45 . . . SC77), only the lower order SCID codes (16 codes for example) are used.

Figure 8:
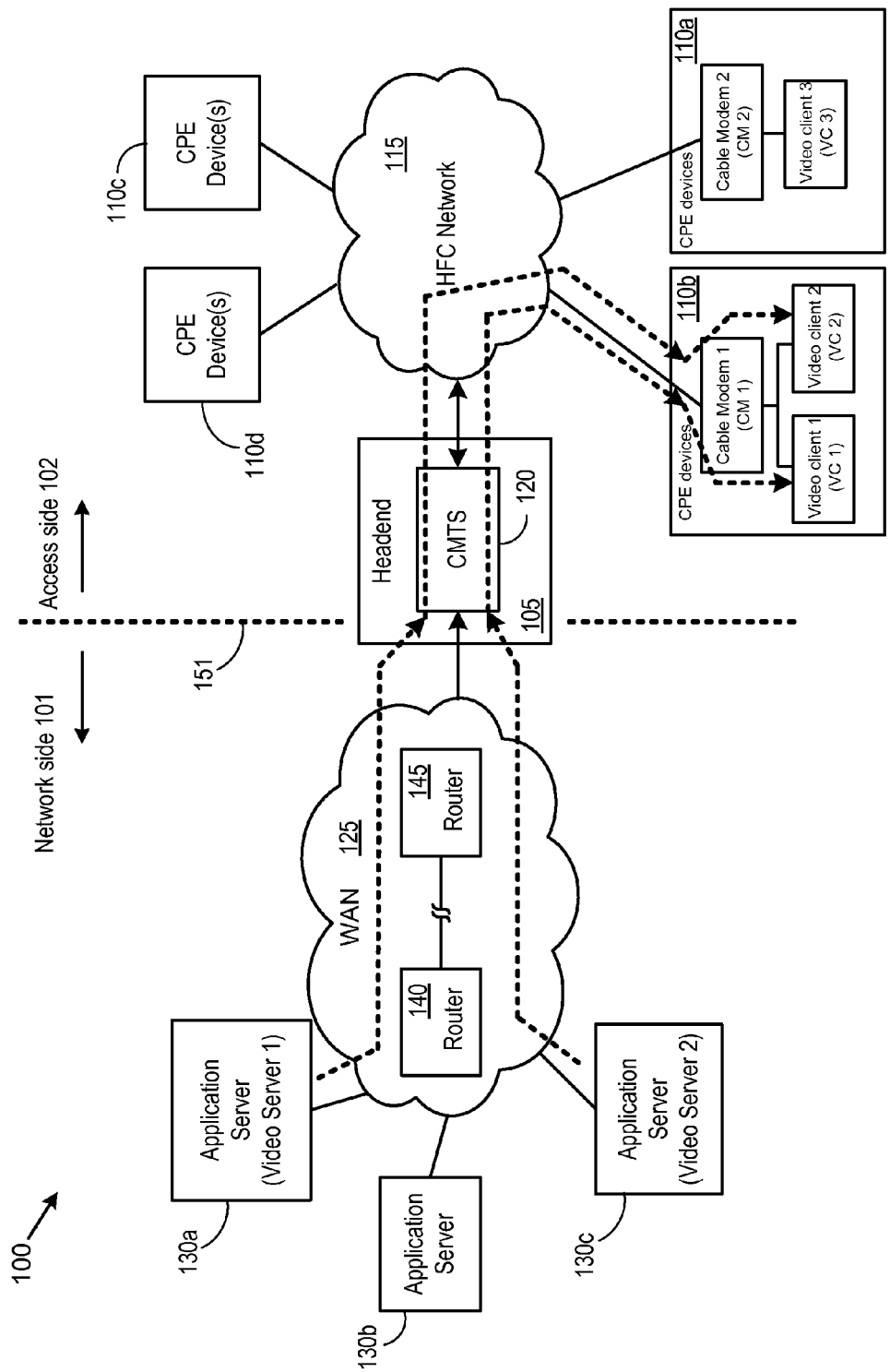
FIG. 8 is a block diagram illustrating a first example of multimedia delivery over the communications network of FIG. 1.

FIG. 8 shows a first example of multimedia delivery over communications network 100. In this example scenario, CPE device 110*b* includes a first cable modem (CM1) and two video clients (VC1 and VC2), while CPE device 110*a* includes a second cable modem (CM2) coupled to a video client (VC3). A few non-exhaustive examples of VC1-VC3 include a display device (such as a television set), a video recorder (such as a VCR, a DVR, or a HD receiver), a video projection device, and a computing device (such as a PC). Application server 130*a* is configured as a first video server VS1 that originates video content for delivery to one or more CPE devices 110*a-d*. Similarly, application server 130*c* is configured as a second video server VS2 that also originates video content for delivery to one or more CPE devices 110*a-d*. The various types of video content can be suitably identified via the SCID codes. For example, the SCID codes can be used for designating the following service classes (SCxx) with respect to the various types of video content:

SC01→hand-held (HH) definition video (1 Mbps data rate),
SC11→standard definition (SD) video (3 Mbps data rate),
SC21→high definition (HD) video (8 Mbps data rate), and
SC31→3-dimensional HD (3DHD) video (12 Mbps data rate).

In the example implementation shown in FIG. 8, VC1 expects to receive a HD video stream, while VC2 expects to receive a 3DHD video stream. To carry out this delivery, video server VS1 inserts an SC21 SCID code into the header of each of the HD data packets and then transmits the HD packets into WAN 125; while video server VS2 inserts an SC31 SCID code into the header of each of the 3DHD data packets and then transmits the 3DHD packets into WAN 125.

As pointed out above, the SC21 and SC31 SCID codes correspond to HD and 3DHD video content respectively.

CMTS 120 receives both sets of data packets and inspects the header of each data packet for the SCID code therein. Upon recognizing that SCID codes SC21 and SC31 are present in the headers of the received data packets that are to be transmitted to CPE device 110b, CMTS 120 configures the communication bandwidth for the access-side communication links (in HFC network 115b etc.) to accommodate HD plus 3DHD video bandwidth (i.e. 8 Mbps+12 Mbps). As a part of this process, CMTS 120 can designate two service flows—a first service flow (SF1) corresponding to the HD video content, and a second service flow (SF2) corresponding to the 3DHD video content.

Cable modem CM1 receives the data packets from HFC network 115 and inspects the header portion of each data packet for the SCID code. The data packets that have a header containing SC21 (HD video) are routed to VC1, while those with SC31 (3DHD) are routed to VC2.

Additional SCID codes may be also used in the headers of the data packets in order to carry out additional functions in CMTS 120, such as for example, prioritizing the 3DHD video delivery packets over other data packets in CMTS 120.

Figure 9:
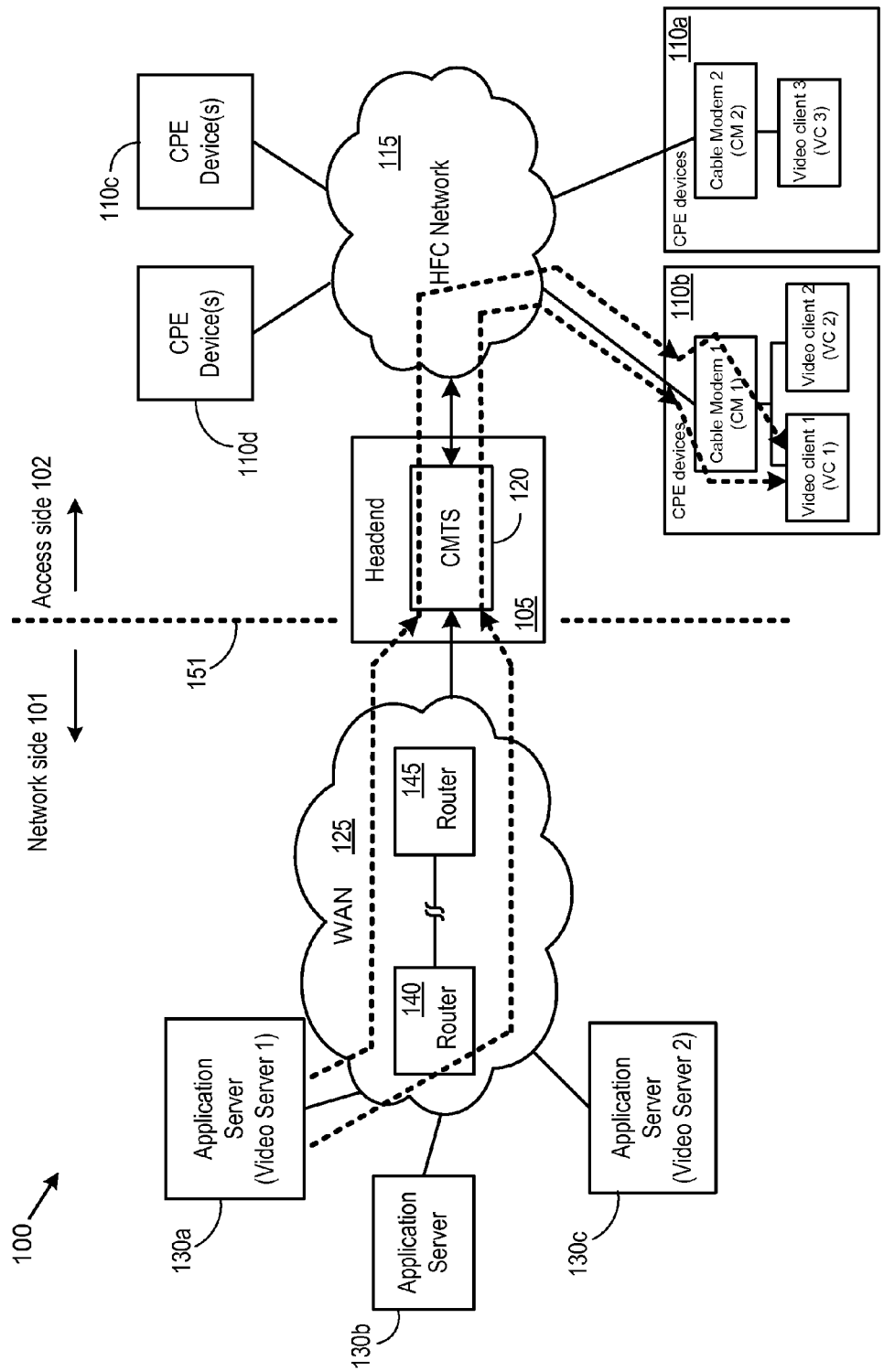
FIG. 9 is a block diagram illustrating a dynamic rearrangement of the multimedia delivery of FIG. 8 based on a change request.

FIG. 9 shows a dynamic rearrangement of the multimedia delivery of FIG. 8, based on a change request. In this example, the change request is initiated by VC1 that requests that the HD video content (corresponding to SCID SC21) be changed to SD video content, and also by VC2 which may be switched off and no longer expects to receive video content. In response to the change request, the 3DHD video content originated by video server 2 is disconnected and video server 1 (VS1) is reconfigured to originate the SD video content replacing the HD video content for the same program. To carry out this operation, VS1 video server transmits only the SD video content with an SC11 SCID data code in each header of the SD data packets. As pointed out above, the SC21 and SC11 SCID codes correspond to HD and SD video content respectively.

CMTS 120 receives both sets of data packets and inspects the header of each data packet for the SCID code located therein. Upon recognizing that only SCID code SC11 is present in the headers of the received data packets, CMTS 120 reconfigures the communication bandwidth for the access-side communication links (in HFC network 115 etc.) to accommodate SD video bandwidth (i.e. 3 Mbps). As a part of this process, CMTS 120 can manipulate two service flows—a first service flow (SF1) corresponding to the old HD video content can be deactivated, and a second service flow (SF3) corresponding to the new SD video content can be activated.

Cable modem CM1 can receive the data packets from HFC network 115 and inspect the header portion of each data packet for the SCID code. The data packets that have a header containing a SC11 code are routed to VC1. Data routing to VC2 is discontinued.

In further examples, one or both of VS1 and VS2 can originate video content that is directed at video client 3 (VC3), while VS1 and/or VS2 continue to deliver video content to VC2 and/or VC1 as well. The SCID codes for the data packets directed at VC3 will be suitably selected in correspondence to the type of desired service.

The dynamic process of using SCID codes that are recognized by the application servers 130a-c as well as CMTS 120 permits accommodation of rapid change requests. Such rapid change requests can be a result of a customer switching TV channels between SD, HD and 3DHD for example. Unlike message-oriented schemes, where there are communications and set-up delays before changes in data content can be carried out, the use of the SCID codes described herein permits various advantageous features such as a rapid response capability to content change requests, and efficient queue management.

While this specification contains many specific implementation details, these should not be construed as limitations on the scope of this disclosure or of what may be claimed, but rather as descriptions of features that may be specific to particular implementations of various features. Certain features that are described in this specification in the context of separate implementations can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a data packet at a first network device, the data packet comprising a packet header and payload, the packet header including a differentiated services code point field;
   identifying one or more network congestion parameters of a network associated with the first network device;
   modifying the differentiated services code point field within the data packet to include service class identifier codes based on the identified one or more network congestion parameters, the service class identifier codes identifying quality of service settings tailored to applications operable to interpret the service class identifier codes;
   forwarding the modified data packet to a second network device suited to interpret the service class identifier codes through one or more intermediate routers that are not suited to interpret the service class identifier codes, wherein the service class identifier codes comprise: a hand-held definition video setting using a 1 Mbps data rate; a standard definition video setting using a 3 Mbps data rate; a high definition video setting using an 8 Mbps data rate; and, a three-dimensional high definition video setting using a 12 Mbps data rate.

2. The method of claim 1, wherein the service class identifier codes comprise control for one or more of bandwidth management, priority, latency, or scheduling algorithms.

3. The method of claim 1, wherein the intermediate routers comprise routers on a public network.

4. The method of claim 3, wherein the first and second network devices comprise one or more of a cable modem termination system, set top box, video server, cable modem, embedded multimedia terminal adapter, or combinations thereof.

5. The method of claim 3, wherein the first and second network devices are operable to use the differentiated services code point field to provide signaling to change one or more transmission parameters associated with a data stream.

6. A system, comprising:
an interface operable to receive a data packet, the data packet comprising a packet header and payload, the packet header including a differentiated services code point field;
a control device operable to identify one or more network traffic parameters of a data stream associated with the received data packet;
the control device being further operable to produce a modified data packet modifying the received data packet to include one or more service class identifier codes, the one or more service class identifier code being selected based on the identified one or more network traffic parameters;
a transmitter operable to forward the modified data packet to a network device suited to interpret the service class identifier codes, the modified data packet being transmitted through one or more intermediate routers that are not suited to interpret the service class identifier codes, wherein the service class identifier codes comprise: a hand-held definition video setting using a 1 Mbps data rate; a standard definition video setting using a 3 Mbps data rate; a high definition video setting using an 8 Mbps data rate; and, a three-dimensional high definition video setting using a 12 Mbps data rate.

7. The system of claim 6, wherein the service class identifier codes comprise control for one or more of bandwidth management, priority, latency, or scheduling algorithms.

8. The system of claim 6, wherein the intermediate routers comprise routers on a public network.

9. The system of claim 8, wherein the system comprises one or more of a cable modem termination system, set top box, video server, cable modem, embedded multimedia terminal adapter, or combinations thereof.

10. The system of claim 8, wherein the system is operable to use the differentiated services code point field to provide signaling to change one or more transmission parameters associated with a data stream.

11. The system of claim 6, wherein the service class identifier codes identify quality of service settings tailored to applications operating on a receiving network device operable to interpret the service class identifier codes.

12. One or more non-transitory computer readable media comprising program code operable to be executed by a processor and upon execution causing the processor to control one or more modules operable to:
receive a data packet, the data packet comprising a packet header and payload, and the packet header including a differentiated services code point field;
identify one or more data transmission parameters of a data stream associated with the received data packet, the data transmission parameters including at least one network congestion parameter;
modify the differentiated services code point field to include a service class identifier code based on the identified at least one network congestion parameter; and
forward the modified data packet to a network device suited to interpret the service class identifier codes through one or more intermediate routers that are not suited to interpret the service class identifier codes, wherein the service class identifier codes comprise: a hand-held definition video setting using a 1 Mbps data rate; a standard definition video setting using a 3 Mbps data rate; a high definition video setting using an 8 Mbps data rate; and, a three-dimensional high definition video setting using a 12 Mbps data rate.

13. The one or more computer readable media of claim 12, wherein the service class identifier codes comprise control for one or more of bandwidth management, priority, latency, or scheduling algorithms.

14. The one or more computer readable media of claim 12, wherein the intermediate routers comprise routers on a public network.

15. The one or more computer readable media of claim 14, wherein the network device comprises one or more of a cable modem termination system, set top box, video server, cable modem, embedded multimedia terminal adapter, or combinations thereof.

16. The one or more computer readable media of claim 14, wherein network devices are operable to use the differentiated services code point field to provide signaling to change the one or more transmission parameters associated with the data stream.

17. The one or more computer readable media of claim 12, wherein the service class identifier codes identifying quality of service settings tailored to applications operable to interpret the service class identifier codes.

* * * * *